United States Patent [19]
Eggert, Jr.

[11] 3,730,586
[45] May 1, 1973

[54] DECELERATING APPARATUS

[75] Inventor: Walter S. Eggert, Jr., Huntingdon Valley, Pa.

[73] Assignee: The Budd Company, Philadelphia, Pa.

[22] Filed: Nov. 24, 1971

[21] Appl. No.: 201,729

[52] U.S. Cl. ................................................297/216
[51] Int. Cl. ..............................................B60r 21/10
[58] Field of Search ......................297/216; 188/1 C; 296/65

[56] References Cited

UNITED STATES PATENTS

| | | |
|---|---|---|
| 3,578,376 | 5/1971 | Hasegawa............................297/216 |
| 2,102,979 | 12/1971 | Smith....................................297/216 |
| 3,552,795 | 1/1971 | Perkins et al........................297/216 |
| 3,087,584 | 4/1963 | Jackson et al. ....................188/1 C |
| 3,669,397 | 6/1972 | LeMire.................................297/216 |

Primary Examiner—Paul R. Gilliam
Attorney—Thomas I. Davenport et al.

[57] ABSTRACT

Apparatus for absorbing energy between a seat and a vehicle having a rod aligned along the axis of deceleration which is associated with bending roller means. The rod is deformed along its length such that it has different modulii of bending. A section of its length having a first modulus or bending is normally associated with the bending roller means such that upon the vehicle being subjected to a crash impact the rod absorbs kinetic energy at a first rate which eliminates high frictional starting forces. The rod includes a second length of different bending modulus from the first length which upon continued relative movement of the seat with respect to the vehicle is advanced into the bending roller means to absorb kinetic energy at a second rate. The energy absorbing rod is of the same area in cross-section throughout its length such that either length is capable of absorbing maximum loads in tension upon impact of the vehicle.

4 Claims, 8 Drawing Figures

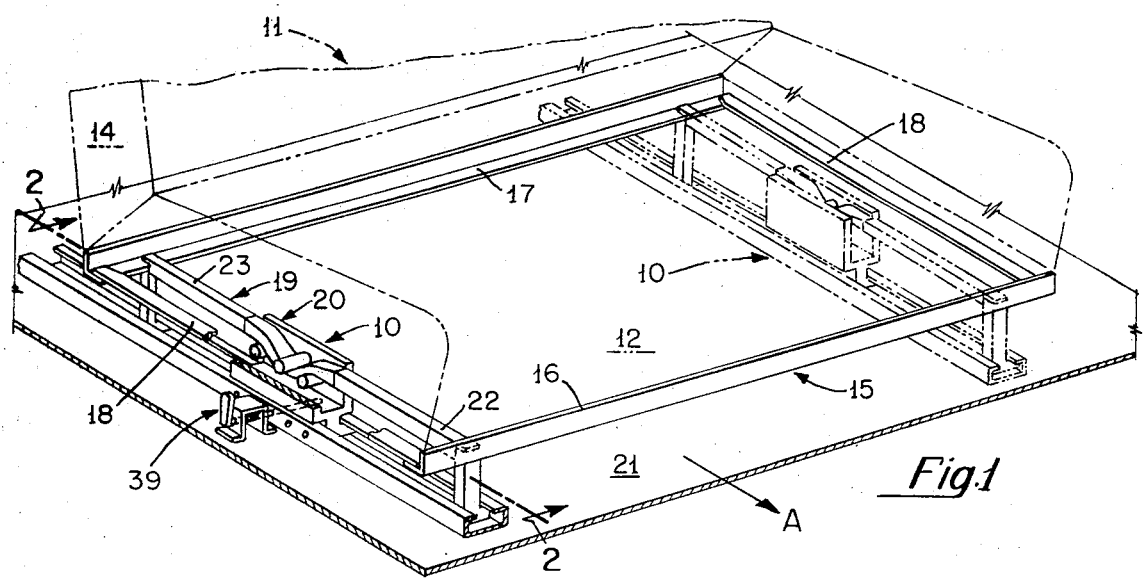
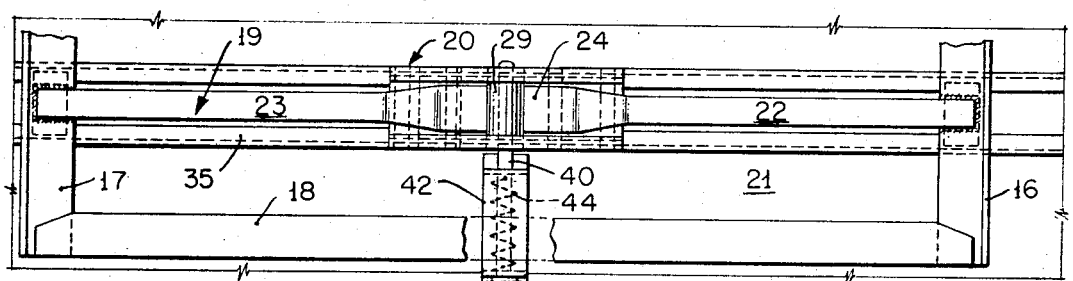
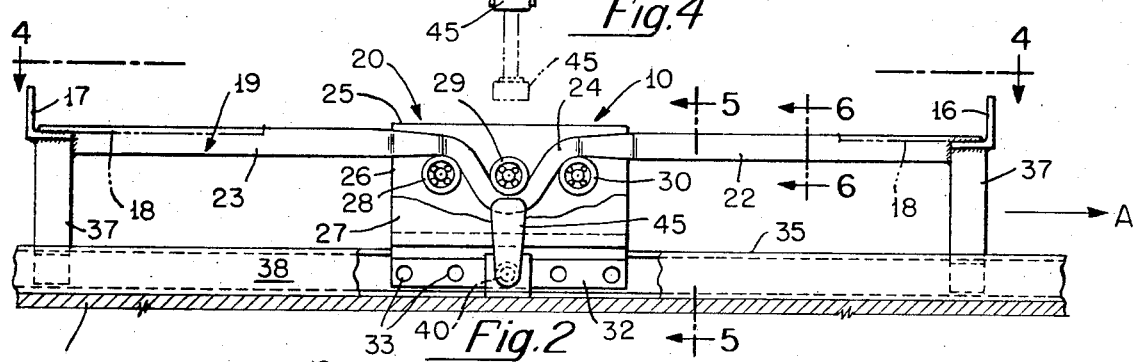
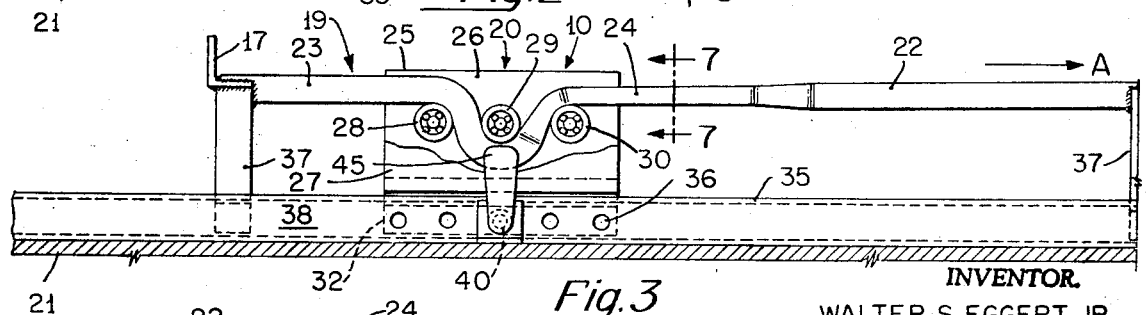

INVENTOR.
WALTER S. EGGERT, JR.
BY
William R. Nolte
AGENT

DECELERATING APPARATUS

During the testing and performance of driver occupied car seats at various automotive testing centers it has become apparent that most seat restraining systems are inadequate. Most systems rely primarily on belts used in conjunction with the seats. The belts employed are essentially of a woven nylon type that provides a considerable amount of deformation and stretch under the crash load. This belt stretching occurs at much too low a stress on the belt system. As a result the driver is not properly restrained to the seat, which loss of control provides additional movement forward during the crash load condition. The driver thus has a different time envelop than the actual seat, such that where the seat may for example be subject to approximately 15 g's of loading the operator may be subjected to as high as 30 to 50 g's. The elasticity of these belts produces a rebound action of the driver against the seat after the crash pulse is initiated. It has been found that the rebound action between the passenger and seat can be lessened if energy absorbing means are also provided between the seat and the vehicle.

Accordingly it is the principal object of this invention to provide an improved passenger seat restraint system which avoids one or more of the disadvantages of the prior art systems.

It is another important object of this invention to provide passenger seat restraint apparatus having energy attenuation means between the seat and the vehicle which eliminates high frictional forces in the apparatus as the seat initially moves in attenuation relative to the vehicle.

It is still another object of this invention to provide a passenger seat restraint apparatus having rod bending energy attenuation means between the seat and the vehicle which eliminates high frictional forces as the rod means is bent and as the seat initially starts to move in attenuation relative to the vehicle.

In accordance with the invention the apparatus for absorbing energy between a seat and a vehicle body comprises bending means mounted between the seat and the vehicle, and rod means aligned along the axes of deceleration of the seat and mounted to be moved through the bending means and deflected thereby. The rod means includes a first length of a first cross section which is normally in engagement with the bending means and a second length of a second cross-section contiguous with the first length. Upon the seat being subjected to decelerating forces due for example to a crash of the vehicle, relative movement between the bending means and the rod causes said first length of rod to absorb kinetic energy at a first rate, and upon further relative movement between said seat and said vehicle which is in the same direction, relative movement between said second length of said rod and said bending means causes absorption of energy therebetween to decelerate said seat relative to said vehicle at a second rate.

For a better understanding of the invention together with other and further objects thereof, reference is had to the following description taken in connection with the drawings wherein:

FIG. 1 is an elevational view partially in section showing a passenger seat in a vehicle such as an automobile with the improved apparatus of the present invention connected between the seat and the floor of the vehicle;

FIG. 2 is a sectional view taken along the lines 2—2 of FIG. 1 showing in greater detail the manner by which the seat, the restraining apparatus, and the floor are connected;

FIG. 3 is a sectional view similar to that shown in FIG. 2 but illustrating the attenuation rod moved relative to bending means affixed to the floor of the vehicle;

FIG. 4 is a view taken along the lines 4—4 showing a plan view of the restraining rod and bending means;

FIG. 6 is a sectional view taken along the lines 6—6 of FIG. 2 showing a portion of the attenuation rod in cross-section;

FIG. 7 is a sectional view taken along the lines 7—7 of FIG. 3 indicating the cross-section of the attenuation of the rod through a flattened portion of the rod;

Figure 8:
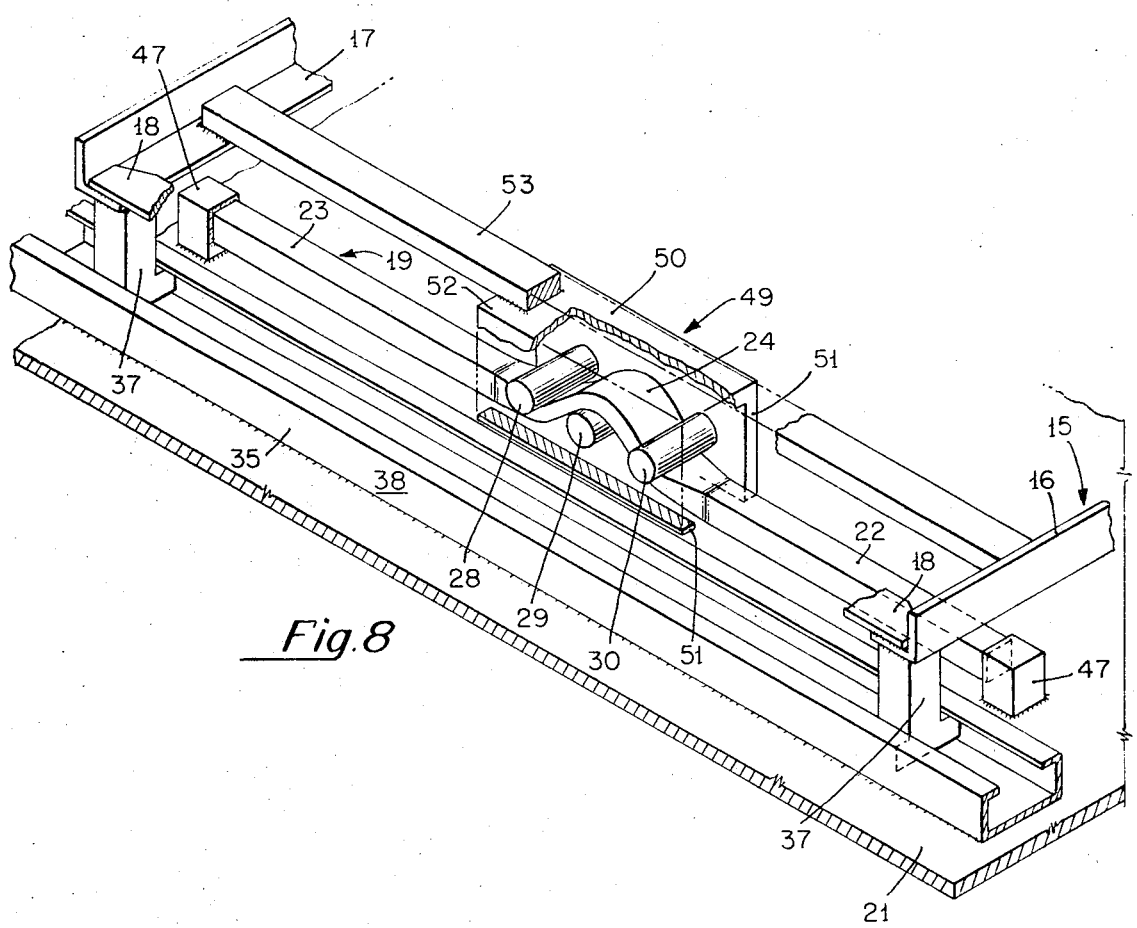
FIG. 8 is a view similar to that of FIG. 1 but illustrating a modified form of the invention.

Referring to the drawings, this invention is illustrated in FIG. 1 for use in an automobile and comprises an attenuation device 10 one of which is provided at opposite ends of an automobile seat 11 which is shown in phantom outline form. The seat 11 has a base portion 12 and an upright back portion 14. The seat base includes a rectangular frame 15 which includes a forward transverse member 16 and a rear transverse member 17 rigidly connected by opposite side frame members 18.

In the preferred form of the invention the device 10 is shown as comprising an energy absorbing rod 19 received in bending means 20 parallel to the longitudinal axis of the vehicle as indicated by the arrow A and which corresponds to the longitudinal axis of deceleration of the seat relative to the floor 21 of the vehicle. The opposite ends of the rod are suitably secured to forward and rear transverse seat frame members 16, 17 respectively. As seen in FIGS. 2, 3, and 4, the energy absorbing rod 19 is of dissimilar cross section along its length. In the present form of the invention the rod is illustrated as being square in cross-section at its opposite end portions as indicated by reference numerals 22, 23 respectively. The rod includes an intermediate portion 24 which may be forged to a reduced vertical dimension to lower its effective bending modulus (FIG. 7). As illustrated in FIG. 2 the flattened section 24 of reduced vertical height is positioned in the at rest or starting position of the seat relative to the bending means 20.

The bending means 20 comprises a U-shaped housing 25 having spaced apart opposed upstanding walls 25, 27 between which, in the present instance, extend a plurality of rollers 28, 29, 30 respectively. As seen in FIG. 2 the intermediate flattened portion 24 of the attenuator rod 19 makes contact with the top peripheral portion of roller 28, continues downwardly to wrap around the lower portion of intermediate roller 29 and then extends upwardly to engage the top peripheral surface of roller 30.

Figure 5:
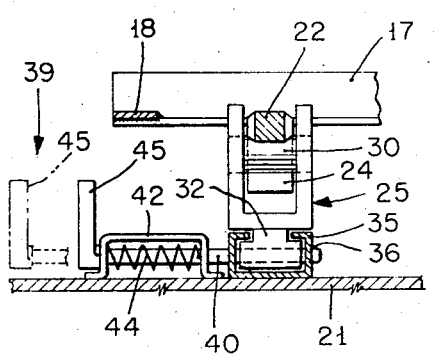
FIG. 5 is a sectional view taken along the lines 5—5 of FIG. 2.

With reference now to FIGS. 2 and 5 the base of the housing 25 includes an inverted T-portion 32 which rides in a seat track member 35 disposed in a longitudinal fore and aft direction and which is fixedly secured to top surface of the floor 21. The track is of a length to enable the seat to be located in different positions fore and aft and also receives inverted T-shaped legs depending from opposite end portions of frame members 16, 17 adjacent the corners of the seat frame.

In order to enable the seat to be adjusted to various fore and aft positions independently of the attenuator rod, manual means 39 comprising an elongated pin 20 is mounted for axial movement normal to the track 35 in hat-shaped floor bracket 42. The inverted T-portion of the housing includes a number of transverse apertures 33 which can, upon shifting the seat, be aligned with apertures 36 in the opposite upright side walls 38 of track 35. The pin 40 rides in suitable apertures in the vertical walls 43 of the hat bracket and is normally urged in a direction normal toward the track by means of encircling compression spring 44 which is secured at one of its ends to a pin and abuts an upright wall 43 of the bracket. The pin includes a handle portion 45 to enable the pin to be moved axially. In the normal locking relationship of the pin 40, its free end is received within aligned apertures 36 of the track and also passes through one of the transverse apertures 33 of the T-portion 32 of the housing. By withdrawing the locking pin from the apertures, and shifting the seat either fore and aft corresponding to increments of distance between adjacent transverse holes 33, the operator may position himself in a desired driving position without disturbing the relationship of the attenuator rod 19 relative to the bending means 25.

In operation, with the manual locking pin 40 in engagement with an aperture 33 in the track and an aperture 36 in the portion 32 of the housing 25, and assuming a crash of the vehicle while moving forwardly in the direction of arrow A, if the force of the impact is slight i.e. is below a given magnitude, the attenuator rod 19 due to its engaged relationship between rollers 28, 29, 30 will withstand or restrain the seat against forward movement relative to the floor 21 of the vehicle. If the force of impact of the vehicle on the other hand exceeds a predetermined magnitude the attenuator rod carried by the seat will be moved through the bending rollers 28, 29, 30. The rollers are freely rotatable so that the kinetic energy absorbed by the attenuator rod is due substantially to the deformation of the intermediate reduced vertical height length 24 of rod 19 as a result of bending. Since the length 24 has a reduced bending modulus in comparison with adjacent lengths 22, 23 the starting force required to enable the seat to get into motion is lower than that if for example either length 22 or 23 were positioned in the rollers. It is thus seen that by forming the intermediate length of the attenuator rod so that the same is of reduced vertical height, and wherein the length has a desired predetermined bending modulus for the material of the rod selected, the initial kinetic energy starting force may be of a predictable magnitude. Moreover the bending modulus of the intermediate section may be selected so that its starting force may be less than the continuing force required to keep the seat in motion. In addition since the attenuator bending rod is of the same cross-sectional area throughout its length, its strength in tension is uniform throughout its entire length to enable the rod to take the maximum G-forces to which the seat is subjected as a result of a crash. It will be apparent moreover that while the intermediate portion of the bending rod is shown as being basically of the same height along its length, the same may be formed of varying vertical height which may increase in the direction from the center outwardly toward its ends. By maintaining the area of the rod in cross-section at any point along its length constant but by varying its vertical height, see FIGS. 6, 7, the bending modulus of the rod may thus be programmed to achieve the desired amount of retardation or energy absorption corresponding to the starting force required.

With reference now to FIG. 8, there is illustrated a modified form of the invention wherein the attenuator rod means 19 are secured to the floor 21 of the vehicle. For this purpose a pair of posts 47 are provided at opposite fore and aft ends of the rod, the posts being suitably secured in an upright position on the floor 21 of the vehicle. The opposite end portions 22, 23 of the rod are suitably fixed to the post 47 as by welding. Bending means 49 comprising inverted U-shaped housing 50 with depending opposed sidewalls 51 include a plurality of bending rollers 28, 29, 30 respectively mounted for rotation between the side walls. The housing 50 includes a horizontally disposed top wall 52 which is fixedly secured to the underside of a fore and aft disposed bracing member 53 of the seat frame 15. The legs 37 of inverted T-shaped configuration affixed to the corners of the seat are suitably received in channel shaped track member 35 to guide the seat in its longitudinal movements.

Upon the occurence of an accident in which the vehicle is caused to suddenly stop, the deformable rod 19 extending between the upright post is also stopped or is arrested in the sense that it is also fixed to the vehicle. However, the seat containing the driver including the bending means secured to the underside of the seat continues to move forward. Since the bending rod is partially wrapped around the rollers, a retardation force is developed as the housing 50 is moved relative to the rod. It is apparent that the force of the deceleration of the passenger seat depends primarily on the stiffness of the bending rod, the cross-section of the rod, and also the diameters of the rollers and the spacing between adjacent rollers. Since the intermediate length of the rod which has less stiffness than the adjacent end lengths of the rod, it is apparent that the initial or starting forces of deceleration are less than if the end lengths or rod were initially between the rollers. Therefore it is seen in the above described construction that the starting force of deceleration of the seat relative to the vehicle can be controlled by the stiffness of the rod initially between the bending means in such a manner that it will be less than the continuing deceleration force which corresponds to relative movement of portion 23 with respect to bending means 25. A programmed transition of kinetic energy absorption can thus be achieved by varying the cross-section or stiffness of the rod along its length while maintaining a uniform cross-sectional area of the rod.

While the invention has been described in detail in the foregoing specification and drawing, it will be obvious to those skilled in the art that various changes and modifications may be made therein. It is aimed therefore to cover all such changes and modifications as fall within the true spirit of the invention.

What is claimed is:

1. Apparatus associated with a vehicle body and a seat including a frame within said body for absorbing kinetic energy of the seat upon its deceleration along an axis relative to the vehicle body, said apparatus comprising bending means within a housing secured against movement relative to said vehicle body, rod means aligned along said axis of deceleration within said vehicle, said rod means having end portions secured to said seat frame and, said rod means having an intermediate portion normally in bending engagement with said bending means, each of said end portions including a first shape in cross section and having a first bending modulus, said intermediate portion having a shape in cross section different from said first shape and having a second bending modulus whereby upon deceleration forces of a predetermined magnitude being applied along said axis by said seat through said frame, said intermediate portion of said rod is moved in bending engagement with said bending means to decelerate said seat at a first rate, and upon continuation of said decelerating forces said end portion of said rod is moved into bending engagement with said bending means to decelerate said seat at a second rate.

2. In the apparatus as set forth in claim 1 wherein said intermediate portion includes an area in cross section equal to the area in cross section of said end portions.

3. In the apparatus set forth in claim 1 and including track means secured to said vehicle body parallel to said axis of deceleration, said housing means of said bending means being received in and mounted for movement in said track means, and lock means coactable with said track means and said housing to selectively position said housing along said track means.

4. Apparatus associated with a vehicle body and a seat including a frame within said body for absorbing kinetic energy of the seat upon its deceleration along an axis relative to the vehicle body, said apparatus including bending means secured to said frame of said seat, rod means aligned along said axis of deceleration within said vehicle, said rod means having end portions secured to said vehicle body, said rod means including an intermediate portion normally in bending engagement with said bending means, each of said end portions including a first shape in cross section and having a first bending modulus, said intermediate portion having a different shape in cross section than said end portions and having a second bending modulus, whereby upon said seat being subjected to deceleration forces of a predetermined magnitude, said seat acting through said frame causes said intermediate portion of said rod to be moved in bending engagement with said bending means to thereby decelerate said seat at a first rate, and upon continuation of said decelerating forces in the same direction an end portion of said rod is moved into bending engagement with said bending means to thereby decelerate said seat at a second rate.

* * * * *